United States Patent
Son et al.

(10) Patent No.: US 10,546,392 B2
(45) Date of Patent: Jan. 28, 2020

(54) IMAGE PROCESSING METHOD AND APPARATUS

(71) Applicant: Samsung Electronics Co., Ltd., Suwon-si (KR)

(72) Inventors: Minjung Son, Suwon-si (KR); Hyun Sung Chang, Seoul (KR); Donghoon Sagong, Suwon-si (KR); Young Hun Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 15/591,378

(22) Filed: May 10, 2017

(65) Prior Publication Data

US 2018/0158174 A1   Jun. 7, 2018

(30) Foreign Application Priority Data

Dec. 5, 2016   (KR) .................. 10-2016-0164129

(51) Int. Cl.
*G06T 7/90* (2017.01)

(52) U.S. Cl.
CPC .................... *G06T 7/90* (2017.01)

(58) Field of Classification Search
CPC . G06T 5/005; G06T 7/90; G06T 2207/10024; G06T 2207/30201
USPC ................................. 382/165, 167
See application file for complete search history.

(56) References Cited

U.S. PATENT DOCUMENTS

| | | | |
|---|---|---|---|
| 7,136,537 B2* | 11/2006 | Pilu | H04N 1/40093 382/274 |
| 8,823,876 B2* | 9/2014 | Fukuda | G06T 5/002 348/571 |
| 2013/0071018 A1* | 3/2013 | Kobiki | G06K 9/4661 382/165 |
| 2013/0335409 A1 | 12/2013 | Yamamoto | |
| 2013/0343646 A1* | 12/2013 | Hata | G06K 9/4652 382/165 |
| 2014/0002723 A1 | 1/2014 | Cook et al. | |
| 2014/0002872 A1 | 1/2014 | Cook et al. | |
| 2018/0152649 A1* | 5/2018 | Kusumi | H04N 5/357 |

FOREIGN PATENT DOCUMENTS

| JP | 2015-87811 A | 5/2015 |
|---|---|---|
| JP | 2015-213243 A | 11/2015 |

(Continued)

OTHER PUBLICATIONS

Robby T. Tan, et al., "Separating Reflection Components of Textured Surfaces using a Single Image," *Proceedings of the Ninth IEEE International Conference on Computer Vision*, ICCV 2003, vol. 2, Oct. 2003, pp. 1-8.

(Continued)

*Primary Examiner* — Daniel G Mariam
(74) *Attorney, Agent, or Firm* — NSIP Law

(57) ABSTRACT

A method to process an image includes: determining a first specular reflection element from an input image based on a feature of chromaticity of pixels included in the input image; extracting a second specular reflection element from the first specular reflection element based on a feature of brightness of the pixels; and correcting the input image based on the second specular reflection element.

29 Claims, 7 Drawing Sheets

(56) References Cited

FOREIGN PATENT DOCUMENTS

KR  10-2016-0063338 A    6/2016
WO  WO2014033743 A2 *  3/2014

OTHER PUBLICATIONS

Qingxiong Yang, et al., "Efficient and Robust Specular Highlight Removal," *IEEE Transactions on Pattern Analysis and Machine Intelligence*, vol. 37, No. 6, Jun. 2015, pp. 1304-1311.
Yuanliu Liu, et al., "Saturation-preserving Specular Reflection Separation," *Proceedings of the IEEE Conference on Computer Vision and Pattern Recognition*, Oct. 2015, pp. 3725-3733.

* cited by examiner

Input image — 310
D — 320
S — 330

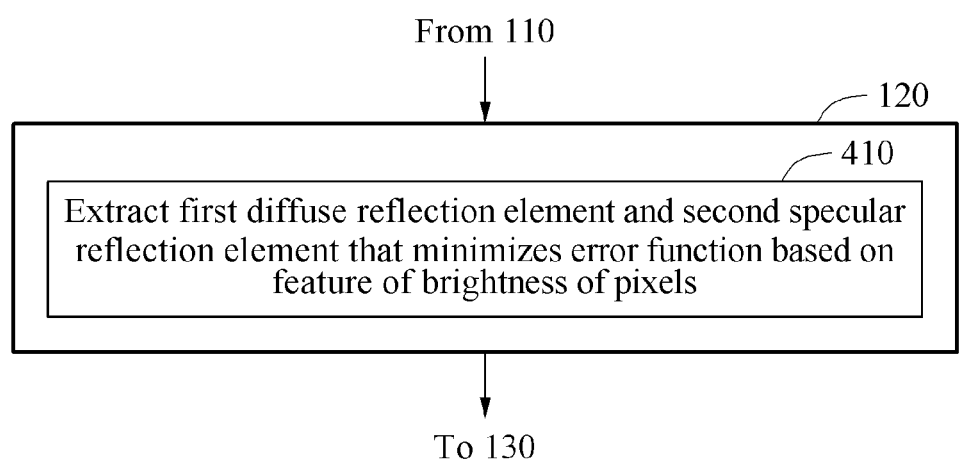
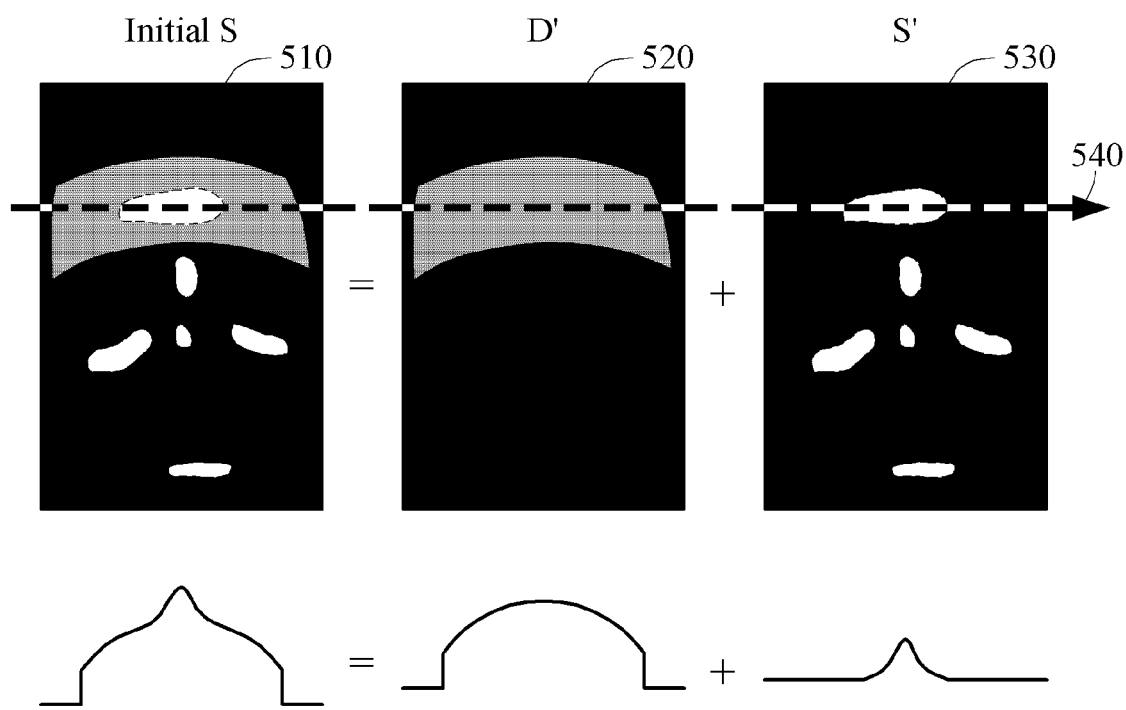

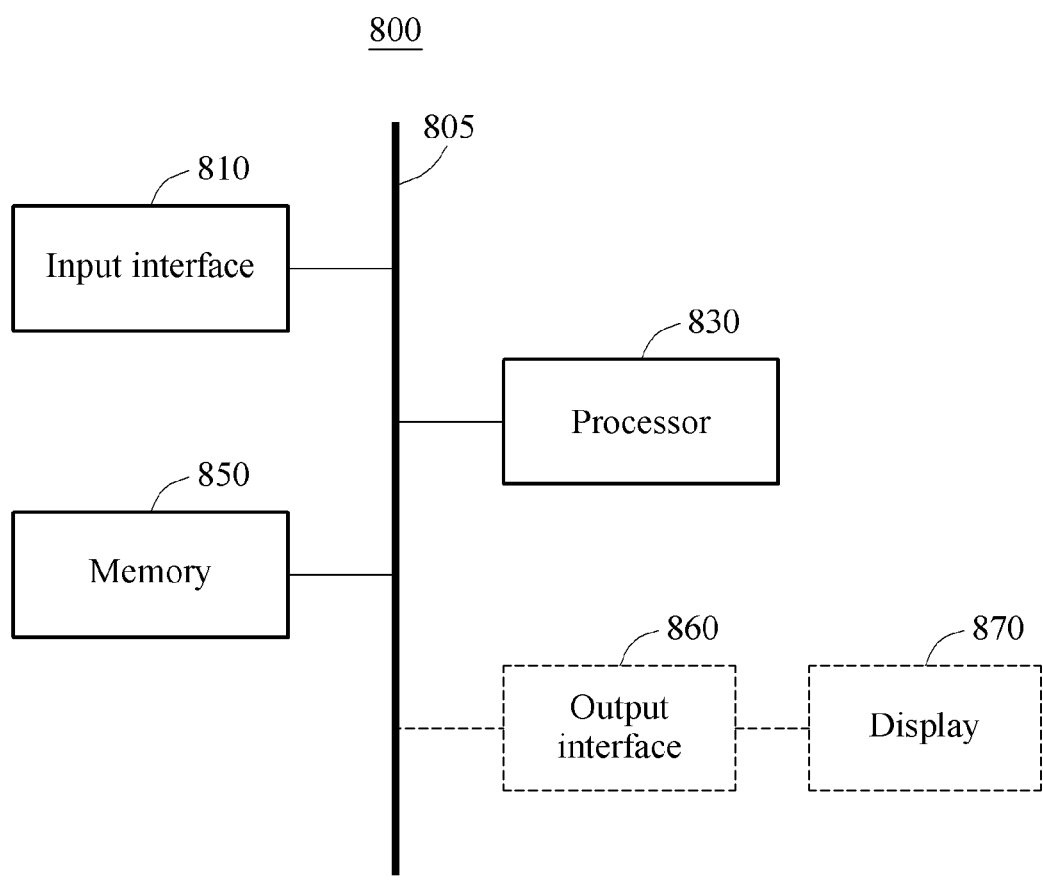

IMAGE PROCESSING METHOD AND APPARATUS

CROSS-REFERENCE TO RELATED APPLICATIONS

This application claims the benefit under 35 USC § 119(a) of Korean Patent Application No. 10-2016-0164129 filed on Dec. 5, 2016, in the Korean Intellectual Property Office, the entire disclosure of which is incorporated herein by reference for all purposes.

BACKGROUND

1. Field

The following description relates to a method and apparatus of processing an image, and, more particularly, to a method and apparatus of processing an image for a specular reflection removal.

2. Description of Related Art

A specular reflection removal method may remove a specular reflection element from an image such that only a diffuse reflection element remains in the image. Because the specular reflection element may interfere with an operation of obtaining information on a form of an image, the specular reflection removal method may be utilized as an image preprocessing operation in various computer vision fields and image processing fields. However, it may be difficult to remove and separate the specular reflection element from a single image without additional information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method to process an image includes: determining a first specular reflection element from an input image based on a feature of chromaticity of pixels included in the input image; extracting a second specular reflection element from the first specular reflection element based on a feature of brightness of the pixels; and correcting the input image based on the second specular reflection element.

The extracting of the second specular reflection element may include extracting, from the first specular reflection element, a diffuse reflection element and the second specular reflection element. The diffuse reflection element and the second specular reflection element may minimize an error function based on the feature of brightness of the pixels.

The diffuse reflection element may include an achromatic diffuse reflection element.

The feature of brightness of the pixels may include any one or any combination of any two or more of a first feature in which a difference between a brightness of pixels of the second specular reflection element and a brightness of neighboring pixels is within a reference amount, a second feature in which the brightness of the pixels of the second specular reflection element is within the reference amount, and a third feature in which a difference between a brightness of pixels belonging to an identical pixel group among pixels of a diffuse reflection element and the brightness of the neighboring pixels is within the reference amount.

The correcting of the input image may include adjusting a size of the second specular reflection element based on the feature of chromaticity.

The correcting of the input image may further include correcting the input image by calculating a weighted average of the first specular reflection element and the second specular reflection element based on a weight in inverse proportion to the feature of chromaticity of the pixels.

The input image may include a single image.

The determining of the first specular reflection element may include determining a diffuse reflection element in a corresponding pixel among the pixels based on a maximum chromaticity of the corresponding pixel and a maximum chromaticity of a reference pixel, the corresponding pixel and the reference pixel including identical surface colors and the reference pixel including the diffuse reflection element, and determining a specular reflection element in the corresponding pixel based on the diffuse reflection element in the corresponding pixel.

In another general aspect, a method to process an image includes: determining a first specular reflection element from an input image based on a feature of chromaticity of pixels included in the input image; estimating a diffuse reflection element from the first specular reflection element through filtering based on a feature of brightness of the pixels; estimating a second specular reflection element based on the estimated diffuse reflection element; and correcting the input image based on the estimated second specular reflection element.

The feature of brightness of the pixels may include a feature in which a difference between a brightness of pixels belonging to an identical pixel group among pixels of the diffuse reflection element and a brightness of neighboring pixels is within a reference amount.

The estimating of the diffuse reflection element may include estimating the diffuse reflection element from the first specular reflection element by iteratively performing the filtering until an iteration number of the filtering reaches a threshold number or the diffuse reflection element updated through the filtering has a value less than or equal to a preset reference value.

The filtering may include either one or both of: a bilateral filtering scheme; and an L0 smoothing scheme.

The estimating of the second specular reflection element may include estimating the second specular reflection element based on a difference between the first specular reflection element and the estimated diffuse reflection element.

The correcting of the input image may include estimating a size of the second specular reflection element based on the feature of chromaticity of the pixels.

The correcting of the input image may include correcting the input image by calculating a weighted average of the first specular reflection element and the second specular reflection element based on a weight in inverse proportion to the feature of chromaticity of the pixels.

The input image may include a single image.

The determining of the first specular reflection element may include determining a diffuse reflection element in a corresponding pixel among the pixels based on a maximum chromaticity of the corresponding pixel and a maximum chromaticity of a reference pixel, the reference pixel and the corresponding pixel including an identical surface color and the reference pixel including the diffuse reflection element, and determining a specular reflection element in the corresponding pixel based on the diffuse reflection element in the corresponding pixel.

A non-transitory computer-readable storage medium may store instructions that, when executed by a processor, cause the processor to perform the method.

In another general aspect, an image processing apparatus includes: an input interface configured to receive an input image; and a processor configured to determine a first specular reflection element from the input image based on a feature of chromaticity of pixels included in the input image, extract a second specular reflection element from the first specular reflection element based on a feature of brightness of the pixels, and correct the input image based on the second specular reflection element.

In another general aspect, an image processing apparatus includes: an input interface configured to receive an input image; and a processor configured to determine a first specular reflection element from the input image based on a feature of chromaticity of pixels included in the input image, estimate a diffuse reflection element from the first specular reflection element through filtering based on a feature of brightness of the pixels, estimate a second specular reflection element based on the estimated diffuse reflection element, and correct the input image based on the estimated second specular reflection element.

In another general aspect, a method to process an image includes: determining a first specular reflection element from an input image based on a feature of chromaticity of pixels included in the input image; and generating a result image by extracting a second specular reflection element from the first specular reflection element based on a feature of brightness of the pixels, and removing the second specular reflection element from the input image; and displaying the result image on a display.

The method may further include: determining an achromatic diffuse reflection element from the input image, wherein the generating of the result image further includes extracting the achromatic diffuse reflection element from the first specular reflection element together with the second specular reflection element.

The generating of the result image may further include maintaining the achromatic diffuse reflection element in the result image.

The determining of the achromatic diffuse reflection element and the determining of the second specular reflection element may minimize an error function which is based on the first diffuse reflection element being piecewisely and smoothly distributed in the input image, and the second specular reflection element being sparsely and smoothly distributed in the input image.

Other features and aspects will be apparent from the following detailed description, the drawings, and the claims.

BRIEF DESCRIPTION OF THE DRAWINGS

FIG. 4 is a flowchart illustrating an example of a method of extracting a second specular reflection element from a first specular reflection element.

FIG. 5 illustrates an example of a process of extracting a diffuse reflection element and a second specular reflection element from a first specular reflection element.

FIG. 8 is a block diagram illustrating an example of an image processing apparatus.

Figure 1:
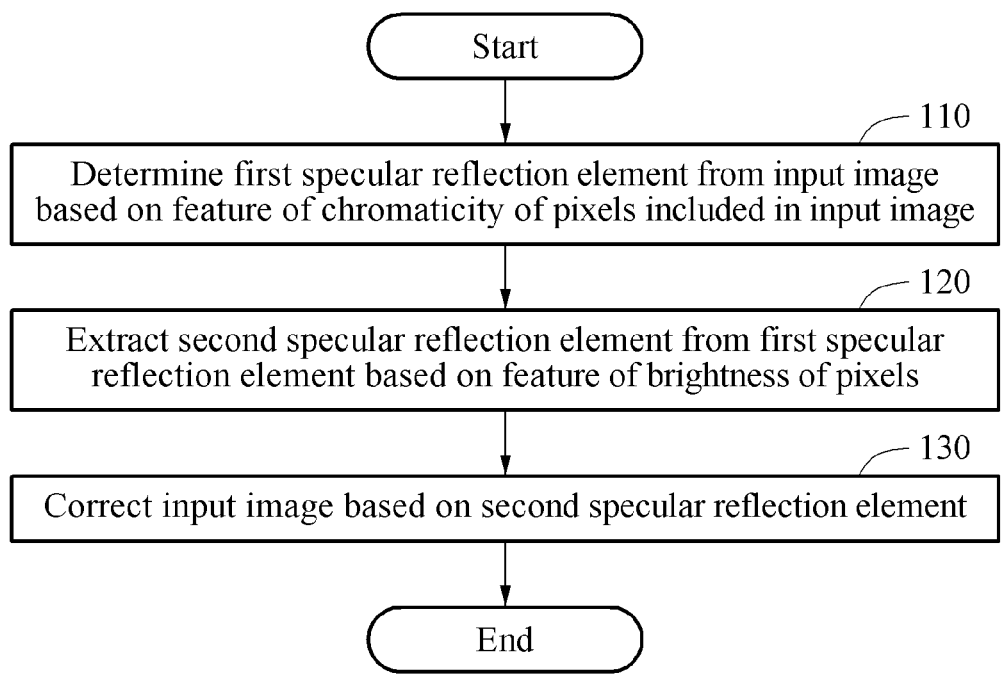
FIG. 1 is a flowchart illustrating an example of a method of processing an image.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Reference will now be made in detail to examples with reference to the accompanying drawings, wherein like reference numerals refer to like elements throughout. Examples provided below may be used to correct an illumination element as a preprocessing operation for enhancing algorithm performance in a computer vision field, an image processing field, an augmented reality (AR) field, and a virtual reality (VR) field. A method of processing an image is applicable to, for example, a three-dimensional (3D) television, a 3D monitor, a 3D digital information display (DID), a camera, and a 3D mobile device.

FIG. 1 is a flowchart illustrating an example of a method of processing an image. Referring to FIG. 1, in operation 110, an image processing apparatus determines a first specular reflection element from an input image, based on a feature of chromaticity of pixels included in the input image.

The chromaticity is associated with a property of color of light. The chromaticity indicates a value that quantitatively specifies a type of color of light regardless of a difference in brightness. For example, the chromaticity is expressed as $$C^u = \frac{I^u}{\sum_{u \in \{r,g,b\}} I^u},$$

wherein u denotes any one or any combination of any two or more of red r, green g, and blue b, $C^u$ denotes a chromaticity of u, and $I^u$ denotes an intensity of u.

The feature of chromaticity is a feature associated with the chromaticity. For example, the feature of chromaticity includes a maximum chromaticity. The maximum chromaticity is a maximum value of $C^u$. For example, the maximum chromaticity is max $\{C^r, C^g, C^b\}$. The feature of chromaticity is also referred to as a feature of color or a feature of hue.

An achromatic color is a color lacking hue, ranging from white to gray to black. Because an achromatic color is without hue and saturation and is distinguished only by brightness, a value of red r, a value of green g, and a value of blue b of the achromatic color are identical. Thus, the maximum chromaticity of the achromatic color is ⅓.

A chromatic color is a color having hue, and may be any color except for the achromatic color. The chromatic color includes three elements, that is, a color, a brightness, and a chromaticity. One or more of a value of red r, a value of green g, and a value of blue b of the chromatic color may be different from the other values. Thus, a maximum chromaticity of the chromatic color may have a value greater than ⅓ and less than or equal to 1. For example, the maximum chromaticity of a primary chromatic color is 1.

The input image includes a specular reflection element and a diffuse reflection element. The specular reflection element is a highlight element appearing when light is totally reflected by an object (target). The diffuse reflection element is an actual color element appearing when light is diffusely reflected by an object (target). The input image may be a single image including the specular reflection element and the diffuse reflection element.

The image processing apparatus determines the specular reflection element included in the input image based on the feature of chromaticity, for example, a maximum chromaticity, of the pixels included in the input image. As is described in detail below, the specular reflection element determined based on the feature of chromaticity may include an achromatic diffuse reflection element. In an example, the specular reflection element is determined as min(Ir,Ig,Ib). In this example, a chromatic diffuse reflection element and the achromatic diffuse reflection element are included in a specular reflection element S.

Hereinafter, for ease of description, the specular reflection element S determined based on the feature of chromaticity from the input image is referred to as an initial specular reflection element or a first specular reflection element, and an actual specular reflection element S' is referred to as a second specular reflection element. Also, an achromatic diffuse reflection element D' is referred to as a first diffuse reflection element.

A detailed description of a method of determining the first specular reflection element from the input image is provided below with reference to FIGS. 3A and 3B.

Still referring to FIG. 1, in operation 120, the image processing apparatus extracts the second specular reflection element from the first specular reflection element based on a feature of brightness of the pixels. For example, the image processing apparatus extracts the second specular reflection element by removing the achromatic diffuse reflection element included in the first specular reflection element.

The feature of brightness of the pixels is a feature associated with brightness. For example, the feature of brightness includes a first feature in which a difference between a brightness of pixels of the second specular reflection element and a brightness of neighboring pixels is within a predetermined or reference amount, a second feature in which the brightness of the pixels of the second specular reflection element is within the predetermined or reference amount, and a third feature in which a difference between a brightness of pixels belonging to an identical pixel group among pixels of the first diffuse reflection element and the brightness of the neighboring pixels is within the predetermined or reference amount. The feature of brightness is also referred to as a feature of shading.

The first feature and the second feature are features of brightness associated with the specular reflection element, and the third feature is a feature of brightness associated with the diffuse reflection element. In more detail, the first feature and the second feature indicate that representation of the specular reflection element applied to a portion of the input image is relatively smooth and sparse. Also, the third feature indicates that representation of the diffuse reflection element is piecewise and smooth in the input image.

As is described below, in an example, the first feature is used as a constraint that requires the change in brightness to be consecutive between neighboring specular reflection elements, and the second feature is used as a constraint that requires the specular reflection element to be sparsely distributed in the input image.

In addition, the third feature is used as a constraint that requires the change in brightness to be consecutive between neighboring diffuse reflection elements in each pixel group. The pixel groups may be distinguished from each other, and the third feature is substantially the same as the first feature, but applies to in an identical pixel group. However, in response to two neighboring pixels belonging to different pixel groups, the third feature may not require the change in brightness of two neighboring pixels to be consecutive.

The image processing apparatus extracts the second specular reflection element from the first specular reflection element based on a constrained optimization method. A description of the constrained optimization method is provided below, with reference to FIGS. 2, 4, and 5.

In operation 130, the image processing apparatus corrects the input image based on the second specular reflection element. The image processing apparatus may remove the second specular reflection element from the input image such that only the diffuse reflection element remains in the input image. In an example, the image processing apparatus adjusts a size of the second specular reflection element based on the feature of chromaticity. For example, the image processing apparatus corrects the input image by calculating a weighted average of the first specular reflection element and the second specular reflection element based on a weight in inverse proportion to the feature of chromaticity, for example, the maximum chromaticity, of the pixels included in the input image.

Figure 2:
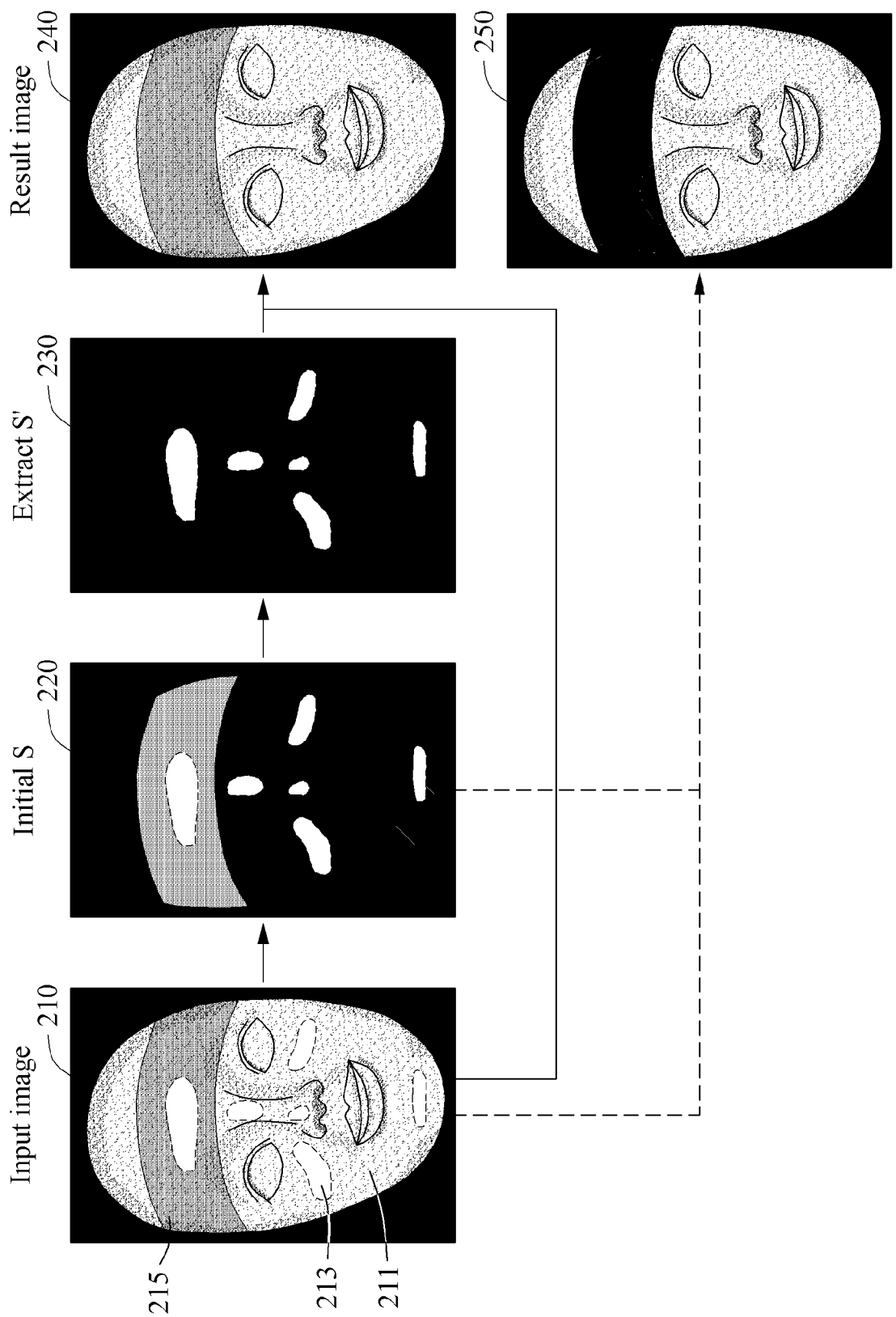
FIG. 2 is a process diagram illustrating an example of performing a method of processing an image.

FIG. 2 is a process diagram illustrating an example of performing a method of processing an image. FIG. 2 illustrates an image 220 representing a first specular reflection element S determined from an input image 210, an image 230 representing a second specular reflection element S' extracted from the first specular reflection element S, a result image 240 obtained by processing the input image 210 based on the second specular reflection element S', and a result image 250 obtained by processing the input image 210 based on the first specular reflection element S.

In FIG. 2, a portion 211 represented by a pattern indicates a chromatic diffuse reflection element, and a white portion 213 surrounded by a dotted line indicates a specular reflection element. Also, a gray portion 215 indicates an achromatic diffuse reflection element.

A portion indicating, for example, a specular reflection element, to which a relatively great change occurs due to a surrounding environment or lighting, rather than a unique feature of a target, may exist in the input image. Because the specular reflection element interferes with obtaining form information of the input image, there may be need to remove the specular reflection element from the input image. A general method of processing an image may remove the specular reflection element from the input image by utilizing images or additional information including, for example, a user input.

An input image processing apparatus provides a scheme for automatically removing the specular reflection element from a single input image. The input image processing apparatus may be implemented by at least one software module, at least one hardware module, or a combination thereof.

The input image processing apparatus may simplify an image processing problem by assuming that a color of an entire target to be photographed is chromatic, and may remove the specular reflection element from the input image. FIGS. 3A and 3B each illustrate an example of a method of determining a first specular reflection element from an input image.

Figure 3A:
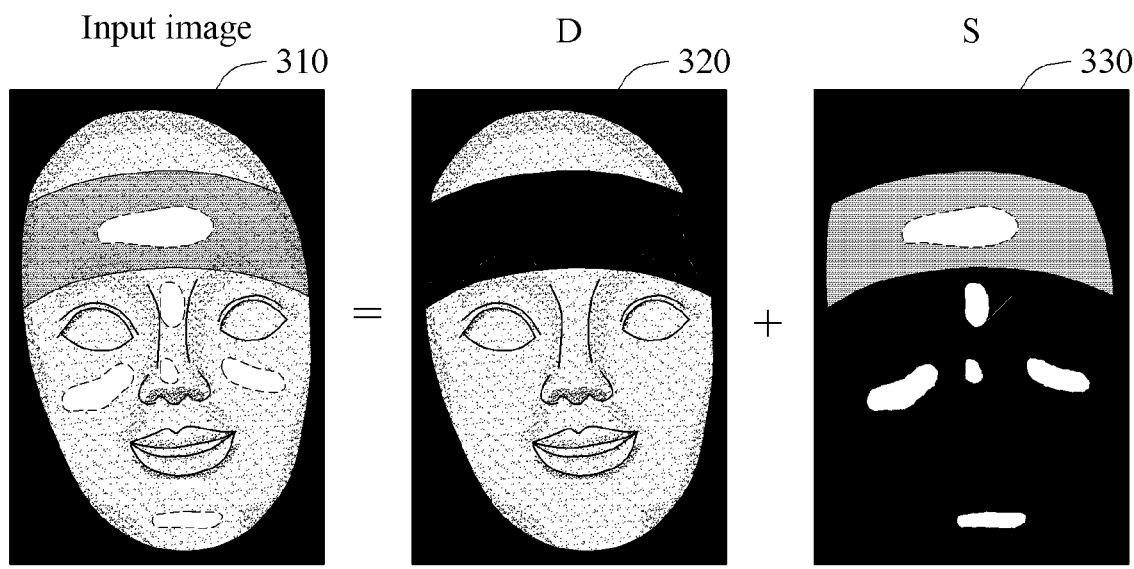
FIGS. 3A and 3B each illustrate an example of a method of determining a first specular reflection element from an input image.

FIG. 3A illustrates an input image 310, an image 320 representing a diffuse reflection element D, and an image 330 representing a specular reflection element S. For example, a red R channel value, a green G channel value, and a blue B channel value of a pixel p included in the input image 310, also referred to as an input image I, are $I_p^r$, $I_p^g$, $I_p^b$, respectively. An RGB channel value of each pixel p of the input image 310 may be represented by a sum $I_p^u = D_p^u + S_p$, $u \in \{r, g, b\}$ of the diffuse reflection element D represented in the image 320 and the specular reflection element S represented as white in the image 330. Hereinafter, an RGB value indicates a red R value, a green G value, and a blue B value. Also, an RGB channel indicates a red R channel, a green G channel, and a blue B channel.

The image processing apparatus assumes that the input image 310 is chromatic and the specular reflection element S is a white light, and then estimates the specular reflection element S of each pixel based on a feature of chromaticity of the pixels included in the input image 310.

Figure 3B:
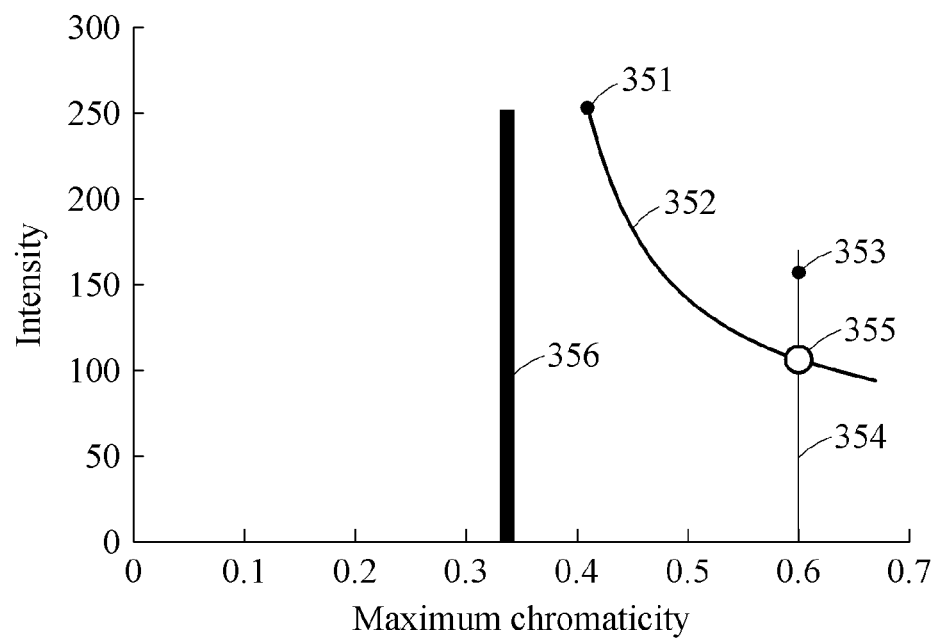

In more detail, referring to FIG. 3B, each of the pixels included in the input image 310 may be mapped to a space of a maximum chromaticity-intensity. For example, the image processing apparatus maps a specular reflection pixel including a specular reflection element and a diffuse reflection element to a specular reflection point 351. In an example, the image processing apparatus iteratively decreases the specular reflection element included in the specular reflection pixel by a predetermined small amount. In this example, the specular reflection pixel is mapped to points on a curved line 352 of FIG. 3B.

In addition, the image processing apparatus maps a diffuse reflection pixel including only the diffuse reflection element to a diffuse reflection point 353. Because a maximum chromaticity of the diffuse reflection pixel has a predetermined value regardless of intensity, the diffuse reflection pixel may be mapped to points on a straight line 354 of FIG. 3B.

In response to the specular reflection pixel and the diffuse reflection pixel having an identical surface color, the specular reflection element included in the specular reflection pixel is completely removed at an intersection point 355 of the curved line 352 and the straight line 354. Thus, the image processing apparatus calculates the diffuse reflection element included in the specular reflection pixel based on the intersection point 355 and obtains the specular reflection element in the specular reflection pixel by removing the diffuse reflection element from the specular reflection pixel. In an example, the image processing apparatus calculates the diffuse reflection element included in the specular reflection pixel using Equation 1, below.

$$\Sigma I_i^{diff} = \frac{\tilde{I}(3\tilde{c}-1)}{\tilde{c}(3\tilde{\Lambda}-1)} \qquad [\text{Equation 1}]$$

In Equation 1, $\Sigma I_i^{diff}$ is a diffuse reflection element included in a specular reflection pixel, $\tilde{c}$ is a maximum chromaticity of the specular reflection pixel, $\tilde{I}$ is a maximum intensity of the specular reflection pixel, and $\tilde{\Lambda}$ is a maximum chromaticity of a reference pixel. The reference pixel and the specular reflection pixel have an identical surface color. The reference pixel may be a pixel neighboring the specular reflection pixel.

Based on above-described methods, the specular reflection element is easily extracted from a single image, but an achromatic diffuse reflection element may be included in the extracted specular reflection element. As described above, a maximum chromaticity of an achromatic pixel including only the diffuse reflection element is ⅓ and the maximum chromaticity of the achromatic pixel is fixed to be (r+s)/{(r+s)+(g+s)+(b+s)}=⅓ (r=g=b), although the specular reflection element is included in the achromatic pixel. Thus, the achromatic pixel may be mapped to points on a straight line 356 of FIG. 3B. A result value calculated using Equation 1 for the achromatic pixel is 0 such that the achromatic diffuse reflection element is classified as the specular reflection element in the input image.

Referring back to FIG. 2, in response to the input image processing apparatus processing an image using the first specular reflection element S, the specular reflection element is removed in addition to the achromatic diffuse reflection element, as illustrated in the result image 250.

Still referring to FIG. 2, the image processing apparatus extracts the second specular reflection element S' illustrated in the image 230, from the first specular reflection element S illustrated in the image 220, based on a feature of brightness of pixels.

The image processing apparatus separates a first diffuse reflection element and the second specular reflection element S' in the first specular reflection element S based on the first diffuse reflection element having a property of being piecewisely and smoothly represented and the second specular reflection element S' having a property of being smoothly and sparsely represented. As described above, the property of the first diffuse reflection element being piecewisely and smoothly represented and the property of the second specular reflection element S' being smoothly and sparsely represented may be defined as the feature of brightness.

The feature of brightness is applied to a constrained optimization method and a filtering-based image processing method to be described below. A detailed description of a method of extracting the second specular reflection element S' from the first specular reflection element S by the image processing apparatus is provided below with reference to FIGS. 4 and 5.

FIG. 4 is a flowchart illustrating an example of a method of extracting a second specular reflection element from a first specular reflection element. Referring to FIG. 4, in operation 410, an image processing apparatus extracts, from the first specular reflection element, a first diffuse reflection element and the second specular reflection element that minimize an error function based on a feature of brightness of pixels. In this example, the first diffuse reflection element includes an achromatic diffuse reflection element.

In more detail, FIG. 5 illustrates an example of a process of extracting a first diffuse reflection element and a second specular reflection element from a first specular reflection element. FIG. 5 illustrates an image 520 representing a first diffuse reflection element D' extracted from an image 510 representing a first specular reflection element S, and an image 530 representing a second specular reflection element S'. Remaining elements except for the second specular reflection element S' are all represented as black in the image 530.

As described above, the first specular reflection element S, which is determined from an input image based on a feature of chromaticity of pixels, includes the first diffuse reflection element D', which is an achromatic diffuse reflection element, in addition to the second specular reflection element S', which is an actual specular reflection element. In this case, the first specular reflection element S is expressed as "first specular reflection element S=second specular reflection element S'+first diffuse reflection element D'".

The graphs illustrated in FIG. 5 each indicate a profile that represents a feature of brightness corresponding to an identical area 540 of a respective one of the images 510, 520, and 530. In an example, the profile illustrated in FIG. 5 is used when the first diffuse reflection element D' and the second specular reflection element S' are separated from the first specular reflection element S which has been previously separated.

In an example, the first diffuse reflection element D' and the second specular reflection element S' are separated from the first specular reflection element S to satisfy a constraint due to the feature of brightness in which a difference between a brightness of pixels of the second specular reflection element S' and a brightness of neighboring pixels is within a predetermined amount, the brightness of the pixels of the second specular reflection element S' is within the predetermined amount, and a difference a between brightness of pixels belonging to an identical pixel group among pixels of the first diffuse reflection element D' and a brightness of the neighboring pixels is within the predetermined amount. The image processing apparatus may obtain the second specular reflection element S' by performing constrained optimization such that an error of an error function E is minimized as long as the constraint is satisfied.

For example, an equation to minimize the error function E is defined as shown in Equation 2. The image processing apparatus extracts the second specular reflection element S' from the first specular reflection element S by determining the first diffuse reflection element D' and the second specular reflection element S' that minimize the error function E using Equation 2.

$$\text{Minimize } E = \alpha \Sigma_p w^d_p \|\nabla D'_p\|^2 + \beta \Sigma_p w^s_p \|\nabla S'_p\|^2 + \Sigma_p \|S'_p\|^2,$$

$$\text{Constraint } D'_p + S'_p = S_p, \ D'_p \geq 0, \ S'_p \geq 0, \text{ where } w^d_p \propto 1/\nabla S_p. \quad \text{[Equation 2]}$$

$\alpha \Sigma_p w^d_p \|\nabla D'_p\|^2$ is a term indicating the first diffuse reflection element D' has the properties of being piecewise and smooth, $\beta \Sigma_p w^s_p \|\nabla S'_p\|^2$ is a term indicating the second specular reflection element S' has the property of being smooth, and $\Sigma_p \|S'_p\|^2$ is a term indicating the second specular reflection element S' has the property of being sparse.

In Equation 2, $\alpha$ and $\beta$ are each a parameter for adjusting an importance ratio of a respective term. $w^d_p$ is a weight provided for a feature that the first diffuse reflection element D' is piecewise. $w^d_p$ is a function in inverse proportion to a difference between the first specular reflection element S and a neighboring pixel that calculates a gradient. $w^d_p$ may be defined as a function for the first specular reflection element S in addition to a function for various values, for example, an RGB value or an intensity of an input image I, used as a reference for distinguishing segments.

In response to the second specular reflection element S' not having the feature of being piecewise, $w^s_p$ is a constant value, for example, 1. If the feature of the second specular reflection element S' being piecewise and smooth is defined, similarly to $w^d_p$, $w^s_p$ may be also defined as a function in inverse proportion to a difference between a value of a specular reflection element and a value of a neighboring pixel.

Referring back to FIG. 2, the image processing apparatus obtains the result image 240 by removing the second specular reflection element S' represented in the image 230 from the input image 210. Because the second specular reflection element S', which is an actual specular reflection element, is removed from the input image 210, the achromatic diffuse reflection element (gray portion) is maintained intact in the result image 240.

In an example, the image processing apparatus obtains the result image 240 by processing the input image 210 by calculating a weighted average of the first specular reflection element S obtained based on the feature of chromaticity of pixels and the second specular reflection element S' obtained based on the feature of brightness of pixels of the first specular reflection element S.

For example, the image processing apparatus defines a final specular reflection element S" (not shown)=(1−w)S+ wS' by calculating the weighted average of the first specular reflection element S and the second specular reflection element S' based on a weight w. In this example, the image processing apparatus obtains $I'''$ (=$I''$−S") as a result image obtained by removing the final specular reflection element S" from an RGB channel of the input image 210.

The weight w may be determined as a value greater than or equal to 0 and less than or equal to 1. For example, based on a reliability of the first specular reflection element S determined based on the feature of chromaticity being relatively high at a chromatic portion, a weight $w_p$ for each pixel p is defined as a value between 0 and 1 in inverse proportion to a maximum chromaticity $C_p$.

The image processing apparatus may also define the weight $w_p$ for each pixel p as described below. The image processing apparatus may normalize the maximum chromaticity $C_p$ having a value between ⅓ and 1 as a value between 0 and 1 using, for example, a linear function, and then define the weight $w_p$ as $w_p=1.0-\min((1.5 C_p-0.5)/t, 1.0)$ by performing thresholding on the maximum chromaticity $C_p$ based on a threshold t in inverse proportion to a result of normalization.

Figure 6:
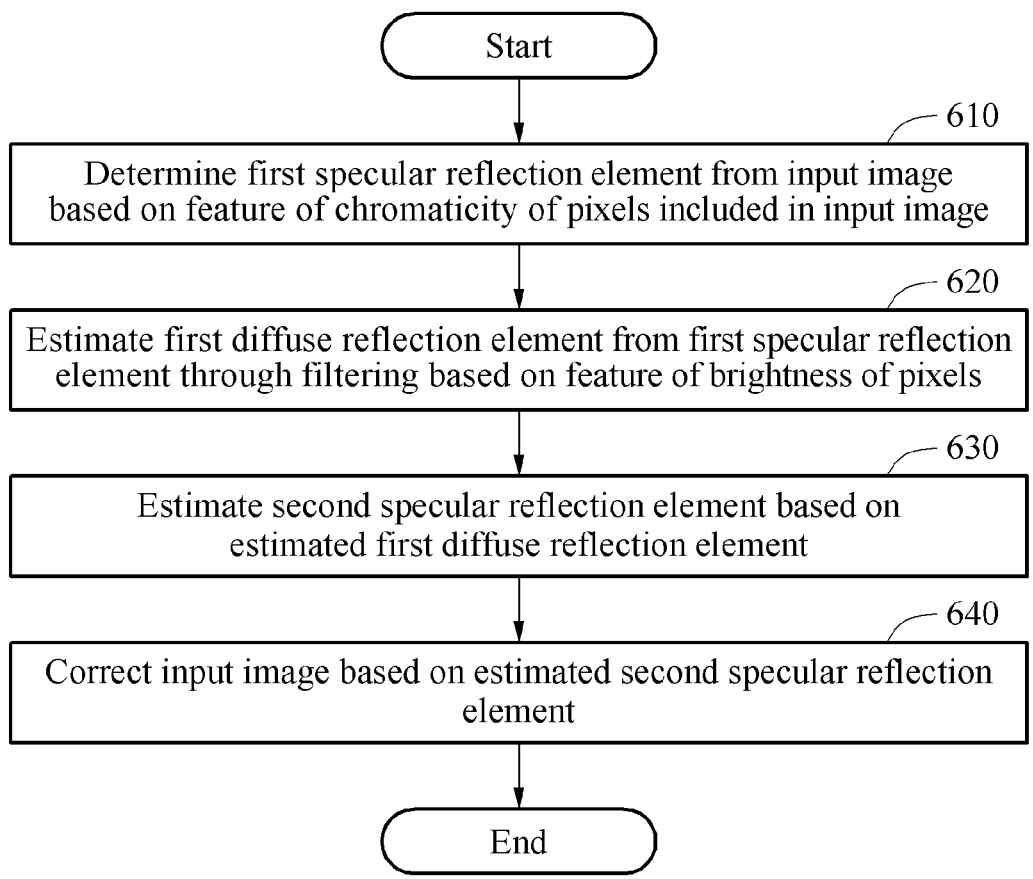
FIG. 6 is a flowchart illustrating another example of a method of processing an image.

FIG. 6 is a flowchart illustrating another example of a method of processing an image. Referring to FIG. 6, in operation 610, an image processing apparatus determines a first specular reflection element from an input image based on a feature of chromaticity of pixels included in the input image. Repeated descriptions will be omitted for increased clarity and conciseness because the descriptions provided with reference to FIGS. 3A and 3B are also applicable to a method by which the image processing apparatus determines the first specular reflection element from the input image in the example of FIG. 6.

Still referring to FIG. 6, in operation 620, the image processing apparatus estimates a first diffuse reflection element from the first specular reflection element determined in operation 610 through filtering based on a feature of brightness of the pixels. The image processing apparatus estimates the first diffuse reflection element from the first specular reflection element by iteratively performing the filtering until an iteration number of the filtering reaches a threshold number or the first diffuse reflection element updated through the filtering has a value less than or equal to a preset reference value. For example, the filtering includes a bilateral filtering scheme and an L0 smoothing scheme.

The feature of brightness of the pixels may include a feature in which a difference between a brightness of pixels belonging to an identical pixel group among pixels of the first diffuse reflection element and a brightness of neighboring pixels is within a predetermined or reference amount.

For example, the image processing apparatus estimates the first diffuse reflection element from the first specular reflection element by performing filtering on the pixels such that the difference between the brightness of the pixels belonging to the identical pixel group among the pixels of the first diffuse reflection element and the brightness of the neighboring pixels has a value within the predetermined or reference amount.

In operation 630, the image processing apparatus estimates a second specular reflection element based on the first diffuse reflection element estimated in operation 610. The image processing apparatus estimates the second specular reflection element based on a difference between the first specular reflection element and the estimated first diffuse reflection element. A description of a method by which the image processing apparatus estimates the first diffuse reflection element from the determined first specular reflection element and then finally estimates the second specular reflection element is provided below with reference to FIG. 7.

In operation 640, the image processing apparatus corrects the input image based on the second specular reflection element estimated in operation 630. Repeated descriptions will be omitted for increased clarity and conciseness because the descriptions provided with reference to FIGS. 1 and 2 are also applicable to the method of correcting the input image based on the second specular reflection element in the example of FIG. 6.

Figure 7:
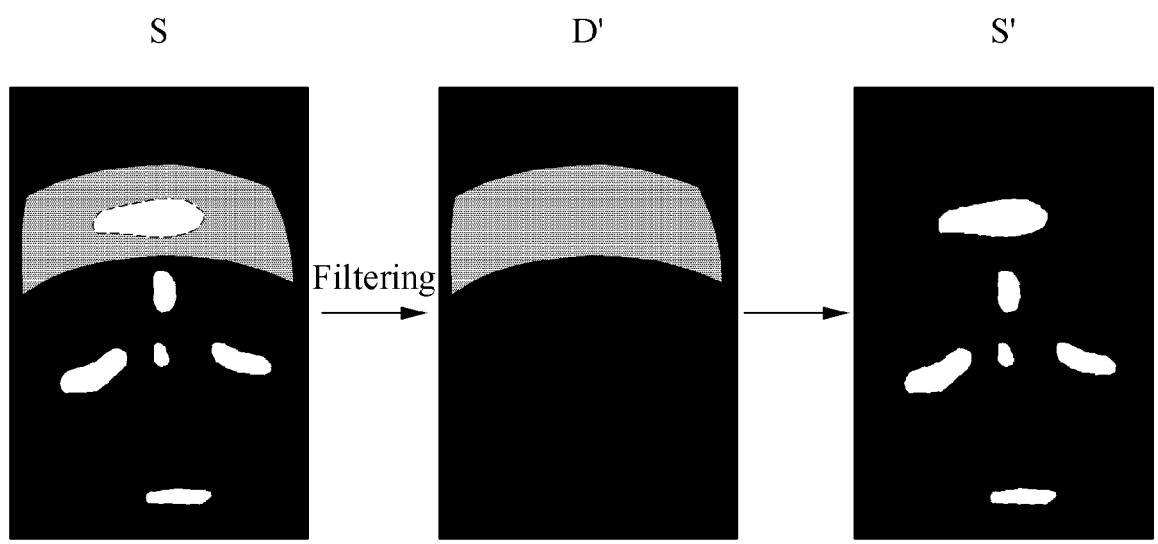
FIG. 7 illustrates an example of a process of estimating a second specular reflection element from a first specular reflection element in the method of FIG. 6.

FIG. 7 illustrates an example of a method of estimating a second specular reflection element from a first specular reflection element, according to an example of FIG. 6. FIG. 7 illustrates a process by which an image processing apparatus estimates a first diffuse reflection element from the first specular reflection element and then finally estimates the second specular reflection element.

Referring to FIG. 5, a first diffuse reflection element D' and a second specular reflection element S' are simultaneously separated from a first specular reflection element S using a constrained optimization scheme. However, referring to FIG. 7, the first diffuse reflection element D' is first estimated from the first specular reflection element S, and then the second specular reflection element S' is estimated. In the example of FIG. 7, an accuracy is relatively low and an amount of processing operation is also low compared to the accuracy and amount of operation of the example of FIG. 5. Thus, the example of FIG. 5 or the example of FIG. 7 may be selected, or the examples of FIGS. 5 and 7 may be appropriately combined based on a desired tradeoff relationship between the accuracy and the amount of processing operation.

Still referring to FIG. 7, in more detail, the image processing apparatus estimates the first diffuse reflection element D' that satisfies a coarse-grained condition through filtering instead of using a constrained optimization scheme, and estimates the second specular reflection element S' based on the estimated first diffuse reflection element D'. For example, the image processing apparatus estimates pixels of a first diffuse reflection element using a filtering function that satisfies a feature of brightness, for example, a third feature, associated with the pixels of the first diffuse reflection element.

The image processing apparatus initializes the first diffuse reflection element D' based on the first specular reflection element S. That is, the image processing apparatus applies the relationship "first diffuse reflection element D'=first specular reflection element S," and updates the first diffuse reflection element D' by iteratively performing the operation $D'=\min(D'^{curr})$" on the first diffuse reflection element D' using $D'^{curr}$, to which a bilateral filtering scheme is applied. The bilateral filtering scheme may be substituted with other filtering schemes, for example, an L0 smoothing scheme, that generate a result that a difference between a brightness of pixels belonging to an identical pixel group among pixels of the first diffuse reflection element D' and a brightness of neighboring pixels is within a predetermined or reference amount.

The image processing apparatus estimates the first diffuse reflection element D' from the first specular reflection element S by iteratively performing filtering until an iteration number of the filtering reaches a threshold number and the first diffuse reflection element D' updated through filtering has a value less than or equal to a preset reference value. The image processing apparatus estimates, from the first specular reflection element S, the second specular reflection element S' as a value (S−D') from which the estimated first diffuse reflection element D' is removed.

FIG. 8 is a block diagram illustrating an example of an image processing apparatus 800. Referring to FIG. 8, the image processing apparatus 800 includes an input interface 810 and a processor 830. The input interface 810 and the processor 830 communicate with each other via a communication bus 805. The image processing apparatus further includes a memory 850.

The input interface 810 receives an input image. The input interface 810 receives the input image from an external device through communication with the image processing apparatus 800 or receives an image photographed directly by the image processing apparatus 800 as the input image. In addition, an image may be stored in the memory 850, and the image processing apparatus may receive the stored image as the input image by loading the stored image from the memory 850.

The processor 830 corrects the input image based on either one or both of a method of processing an image based on a constrained optimization scheme and a method of processing an image based on a filtering scheme.

An operation of the processor 830 performed when the method of processing the image based on the constrained optimization scheme is used is as follows. The processor 830 extracts a second specular reflection element S' from a first specular reflection element S based on a feature of brightness of pixels. The feature of brightness of the pixels includes any one or any combination of any two or more of a first feature in which a difference between a brightness of pixels of the second specular reflection element S' and a brightness of neighboring pixels is within a predetermined or reference amount, a second feature in which the brightness of the pixels of the second specular reflection element S' is within the predetermined or reference amount, and a third feature in which a difference between a brightness of pixels belonging to an identical pixel group among pixels of a diffuse reflection element and a brightness of the neighboring pixels is within the predetermined or reference amount. The processor 830 corrects the input image based on the second specular reflection element S'.

An operation of the processor 830 performed when the method of processing the image based on the filtering scheme is used is as follows. The processor 830 determines the first specular reflection element S from the input image based on a feature of chromaticity of pixels included in the input image. The processor 830 estimates a diffuse reflection element D' from the first specular reflection element S through filtering based on the feature of brightness of pixels. The feature of brightness of pixels includes a feature in which a difference between a brightness of pixels belonging to an identical pixel group among pixels of the diffuse reflection element D' and a brightness of neighboring pixels is within a predetermined or reference amount. The filtering includes, for example, a bilateral filtering scheme and an L0 smoothing scheme. The processor 830 estimates the second specular reflection element S' based on the estimated diffuse reflection element D'. The processor 830 corrects the input image based on the estimated second specular reflection element S'.

In addition, the processor 830 may perform at least one method described above with reference to FIGS. 1 through 7 or an algorithm corresponding to the at least one method. The processor 830 executes a program and controls the image processing apparatus 800. A program code executed by the processor 830 may be stored in the memory 850. The image processing apparatus 800 is connected to an external device, for example, a personal computer (PC) or a network, through an input and output device (not shown), thereby performing a data exchange. The image processing apparatus 800 may include any one of various electronic systems, for example, a television, a smart television, and a smartphone.

The memory 850 stores the corrected input image. The memory 850 may be a volatile memory or a non-volatile memory.

Still referring to FIG. 8, the image processing apparatus 800 may further include an output interface 860. The output interface may transmit the corrected input image. For example, the corrected input image may be transmitted to a three-dimensional (3D) display 870, which may be included in the image processing apparatus 800, or may be a separate component. The corrected input image may be directly displayed without using the output interface.

The input interface 810, the processor 830, the memory 850, the output interface 860, and the display 870 in FIG. 8 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method to process an image, the method comprising:
   determining a first specular reflection element from an input image based on a feature of chromaticity of pixels included in the input image;
   extracting a second specular reflection element from the first specular reflection element based on a feature of brightness of the pixels; and
   correcting the input image based on the second specular reflection element.

2. The method of claim 1, wherein the extracting of the second specular reflection element comprises extracting, from the first specular reflection element, a diffuse reflection element and the second specular reflection element, and
   wherein the diffuse reflection element and the second specular reflection element minimize an error function based on the feature of brightness of the pixels.

3. The method of claim 2, wherein the diffuse reflection element comprises an achromatic diffuse reflection element.

4. The method of claim 2, wherein the first specular reflection element is greater than the second specular reflection element and greater than tte diffuse reflection element.

5. The method of claim 1, wherein the feature of brightness of the pixels comprises any one or any combination of any two or more of a first feature in which a difference between a brightness of pixels of the second specular reflection element and a brightness of neighboring pixels is within a reference amount, a second feature in which the brightness of the pixels of the second specular reflection element is within the reference amount, and a third feature in which a difference between a brightness of pixels belonging to an identical pixel group among pixels of a diffuse reflection element and the brightness of the neighboring pixels is within the reference amount.

6. The method of claim 1, wherein the correcting of the input image comprises adjusting a size of the second specular reflection element based on the feature of chromaticity of the pixels.

7. The method of claim 6, wherein the correcting of the input image further comprises correcting the input image by calculating a weighted average of the first specular reflection element and the second specular reflection element based on a weight in inverse proportion to the feature of chromaticity of the pixels.

8. The method of claim 6, wherein the correcting of the input image further comprises calculating a weighted average of the first specular reflection element and the second specular reflection element based on a determined weight that is in inverse proportion to the feature of chromaticity of the pixels.

9. The method of claim 1, wherein the input image comprises a single image.

10. The method of claim 1, wherein the determining of the first specular reflection element comprises determining a diffuse reflection element in a corresponding pixel among the pixels based on a maximum chromaticity of the corresponding pixel and a maximum chromaticity of a reference pixel, the corresponding pixel and the reference pixel comprising identical surface colors and the reference pixel comprising the diffuse reflection element, and determining a specular reflection element in the corresponding pixel based on the diffuse reflection element in the corresponding pixel.

11. A non-transitory computer-readable storage medium storing instructions that, when executed by a processor, cause the processor to perform the method of claim 1.

12. The method of claim 1, wherein the extracting of the second specular reflection element comprises extracting, from the first specular reflection element, a diffuse reflection element and the second specular reflection element, and
  wherein the extracting of the diffuse reflection element and the second specular reflection element includes performing an optimization operation corresponding to a minimization of an error function, which considers the diffuse reflection element, the second specular reflection element, and the feature of brightness of the pixels.

13. A method to process an image, the method comprising:
  determining a first specular reflection element from an input image based on a feature of chromaticity of pixels included in the input image;
  estimating a diffuse reflection element from the first specular reflection element through filtering based on a feature of brightness of the pixels;
  estimating a second specular reflection element based on the estimated diffuse reflection element; and
  correcting the input image based on the estimated second specular reflection element.

14. The method of claim 13, wherein the feature of brightness of the pixels comprises a feature in which a difference between a brightness of pixels belonging to an identical pixel group among pixels of the diffuse reflection element and a brightness of neighboring pixels is within a reference amount.

15. The method of claim 14, wherein the filtering includes either one or both of:
  a bilateral filtering scheme; and
  an L0 smoothing scheme.

16. The method of claim 13, wherein the estimating of the diffuse reflection element comprises estimating the diffuse reflection element from the first specular reflection element by iteratively performing the filtering until an iteration number of the filtering reaches a threshold number or the diffuse reflection element updated through the filtering has a value less than or equal to a preset reference value.

17. The method of claim 13, wherein the estimating of the second specular reflection element comprises estimating the second specular reflection element based on a difference between the first specular reflection element and the estimated diffuse reflection element.

18. The method of claim 13, wherein the correcting of the input image comprises estimating a size of the second specular reflection element based on the feature of chromaticity of the pixels.

19. The method of claim 18, wherein the correcting of the input image comprises correcting the input image by calculating a weighted average of the first specular reflection element and the second specular reflection element based on a weight in inverse proportion to the feature of chromaticity of the pixels.

20. The method of claim 13, wherein the input image comprises a single image.

21. The method of claim 13, wherein the determining of the first specular reflection element comprises determining a diffuse reflection element in a corresponding pixel among the pixels based on a maximum chromaticity of the corresponding pixel and a maximum chromaticity of a reference pixel, the reference pixel and the corresponding pixel comprising an identical surface color and the reference pixel comprising the diffuse reflection element, and determining a specular reflection element in the corresponding pixel based on the diffuse reflection element in the corresponding pixel.

22. An image processing apparatus, comprising:
  an input interface configured to receive an input image; and
  a processor configured to
    determine a first specular reflection element from the input image based on a feature of chromaticity of pixels included in the input image,
    extract a second specular reflection element from the first specular reflection element based on a feature of brightness of the pixels, and
    correct the input image based on the second specular reflection element.

23. The image processing apparatus of claim 22, wherein the processor is further configured to extract a third specular reflection element from the second specular reflection element, and correct the input image based on the third specular reflection element, and
  wherein, for determining the third specular reflection element, the processor is further configured to adjust a size of the second specular reflection element based on the feature of chromaticity of the pixels.

24. The image processing apparatus of claim 23, wherein, for the determining of the third specular reflection element, the processor is further configured to calculate a weighted average of the first specular reflection element and the second specular reflection element based on a determined weight that is in inverse proportion to the feature of chromaticity of the pixels.

25. An image processing apparatus, comprising:
  an input interface configured to receive an input image; and
  a processor configured to
    determine a first specular reflection element from the input image based on a feature of chromaticity of pixels included in the input image,
    estimate a diffuse reflection element from the first specular reflection element through filtering based on a feature of brightness of the pixels,
    estimate a second specular reflection element based on the estimated diffuse reflection element, and
    correct the input image based on the estimated second specular reflection element.

26. A method to process an image, the method comprising:
  determining a first specular reflection element from an input image based on a feature of chromaticity of pixels included in the input image; and
  generating a result image by extracting a second specular reflection element from the first specular reflection element based on a feature of brightness of the pixels, and removing the second specular reflection element from the input image; and
  displaying the result image on a display.

27. The method of claim 26, further comprising:
  determining an achromatic diffuse reflection element from the input image,
  wherein the generating of the result image comprises extracting the achromatic diffuse reflection element from the first specular reflection element.

28. The method of claim 27, wherein the generating of the result image further comprises maintaining the achromatic diffuse reflection element in the result image.

29. The method of claim 27, wherein the achromatic diffuse reflection element and the second specular reflection element minimize an error function which is based on the first diffuse reflection element being piecewisely and smoothly distributed in the input image, and the second specular reflection element being sparsely and smoothly distributed in the input image.

* * * * *